R. Rice,
Brake.

No. 78,762.    Patented June 9, 1868.

Witnesses
N. B. Smith
Alex Mahon

Inventor
Rodney Rice
by atty Am. Smith

United States Patent Office.

RODNEY RICE, OF PITTSFIELD, VERMONT, ASSIGNOR TO HIMSELF AND J. H. SPAULDING.

Letters Patent No. 78,762, dated June 9, 1868.

IMPROVEMENT IN WAGON AND CARRIAGE-BRAKE.

The Schedule referred to in these Letters Patent and making part of the same.

TO ALL WHOM IT MAY CONCERN:

Be it known that I, RODNEY RICE, of Pittsfield, county of Rutland, and State of Vermont, have invented certain new and useful Improvements in Carriage and Wagon-Brakes; and I do hereby declare the following to be a full, clear, and exact description of the same, reference being had to the accompanying drawings, making a part of this specification, in which—

Figure 1:
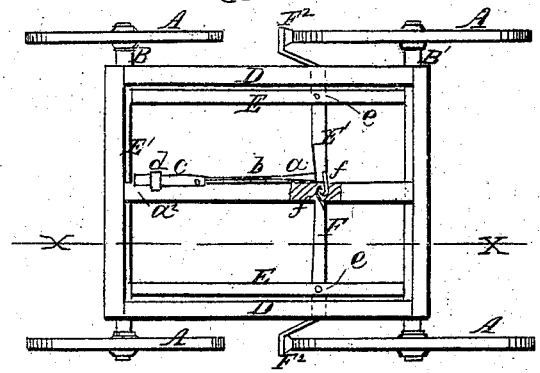
Figure 2:
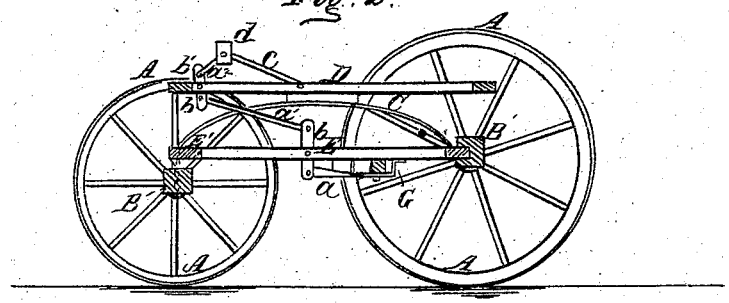

Figure 1 is a plan or top view of the running-gear of a carriage or wagon, with the coupling broken away in part, to show the arrangement of the brake-levers, and Figure 2 is a longitudinal vertical section of the same, taken in line $x\ x$, fig. 1.

Similar letters of reference denote corresponding parts in both figures.

My invention consists in a novel arrangement of brake-levers, and devices for operating the same, whereby the driver is enabled readily and conveniently to operate the brakes with his foot while occupying his seat in the vehicle, as hereinafter described.

To enable others to apply and use my invention, I will proceed to describe the same with reference to the drawings.

A A represent the wheels, B B' the axles, C the springs, and D the bottom frame of the body of the wagon or carriage, all of which parts may be of any desired construction and arrangement, or combined in any usual or desired manner.

E is a coupling-frame, consisting of three longitudinal bars, framed together at their rear ends and to the rear axle B', and connected at their forward ends by a transverse bar, E', through which the frame is coupled or bolted to the forward axle in the usual manner.

F F¹ are brake-levers, pivoted to the outer coupling-frame bars, as shown at $e$, and provided at their outer ends with brakes, F², arranged in front of and adapted to operate upon the rear wheels. Said brake-levers are provided at their inner ends with interlocking hooks, $f$, or other suitable sliding joint or connection, which allows them to vibrate upon their independent pivots, while at the same time it so unites them as to cause them to act together, and apply the brakes simultaneously to both wheels. An angle, plate or loop, G, attached to the central coupling-frame bar, serves to guide and steady the inner end of the levers, and to regulate the extent of their throw.

One of the levers, F¹, has connected to it the rear end of a link, $a$, the forward end of which is connected to the lower end of a short upright lever, $b$, pivoted centrally to the central coupling-frame bar. The upper end of lever $b$ is in turn connected by a link, $a^1$, to the lower end of a second upright lever, $b'$, pivoted in the bottom frame, D, of the carriage or wagon-body, near the forward end. Lever $b'$ extends up through the floor or bottom of the carriage-body, and is connected by a link, $a^2$, to the forward end of a treadle, $c$, the rear end of said treadle being pivoted to the floor of the carriage or wagon in the manner represented in fig. 2.

$d$ is a stirrup, pivoted to the treadle $c$ at or near its joint with link $a^2$, and is designed to be located in convenient position to be occupied by the foot of the driver on his seat.

The operation will be readily understood. The driver, when he wishes to apply the brakes, presses with his foot upon the treadle $c$, with any required force, when the descent of the treadle from its inclined position represented in the drawing, fig. 2, serves to thrust or press forward the upper end of lever $b$, and by the arrangement of links and levers described, the inner ends of the brake-levers F F¹ are drawn forward, forcing the brakes into contact with the wheels, as desired. A spring, of any desired form or construction, may be arranged within the loop G, in front of the inner end of the brake-levers, for the purpose of retracting the levers, and releasing the brakes, when the pressure of the foot of the driver is withdrawn.

Having now described my invention, what I claim, and desire to secure by Letters Patent, is—

1. The treadle $c$, levers $b\ b$, and links $a\ a^1$, in combination with the brake-levers F F¹, arranged and operating substantially as described.

2. The brake-levers F F¹, provided at their inner ends with interlocking hooks, $f$, working in the loop G, substantially as and for the purpose described.

3. The independently-hinged brake-levers F F¹, connected centrally by a sliding or hook-joint, and operated by means of levers and connecting-links, arranged substantially as described.

RODNEY RICE.

Witnesses:
ALBERT VOSE,
HENRY A. VOSE.